Jan. 24, 1950 — C. D. PANTON — 2,495,542
CHECK VALVE
Filed Oct. 25, 1945
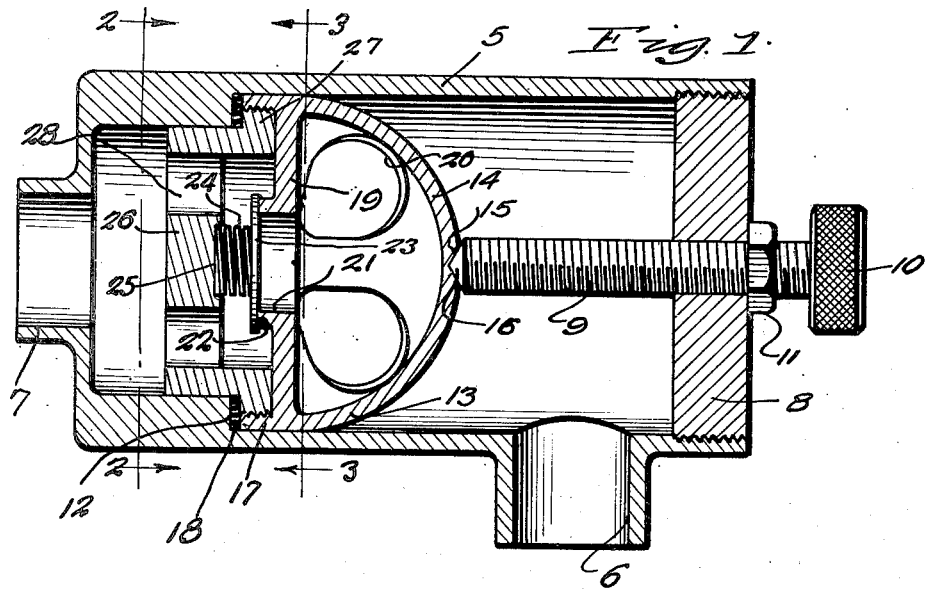
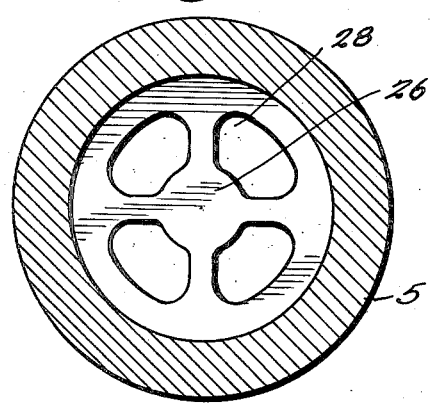
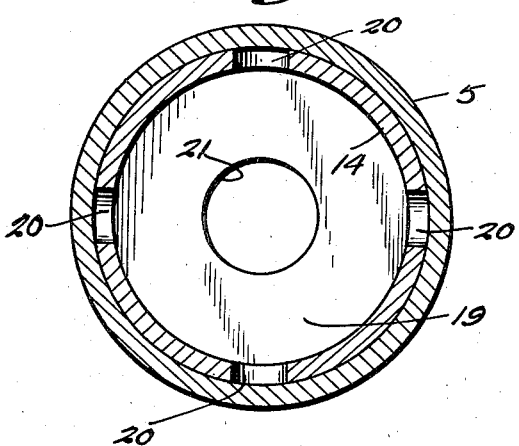
Inventor
CHARLES D. PANTON
By Clarence A. O'Brien
and Harvey B. Jacobson
Attorneys Patented Jan. 24, 1950

2,495,542

UNITED STATES PATENT OFFICE 2,495,542

CHECK VALVE

Charles D. Panton, Eldred, Pa.

Application October 25, 1945, Serial No. 624,510

1 Claim. (Cl. 251—144)

The present invention relates to new and useful improvements in check valves designed particularly for use in connection with fluid compressors for controlling the discharge of the fluid from the compressor to the storage line.

Considerable difficulty has been experienced in constructing a check valve for use in the manner indicated due to the relatively high speed necessarily imposed upon the moving parts and the valve otherwise being subjected to considerable stress tending toward rapid depreciation of the material.

It is accordingly an object of the present invention to provide a check valve of this character capable of withstanding the stresses and strains imposed thereon and which at the same time is simple and practical in construction, efficient and reliable in operation, relatively inexpensive to manufacture and including a valve cage arranged for convenient removal from the valve body for replacement and repair, when necessary.

Other objects and advantages reside in the details of construction and operation as more fully hereinafter described and claimed, reference being had to the accompanying drawings forming part hereof, wherein like numeral refer to like parts throughout, and in which:

Figure 1 is a longitudinal sectional view of the valve, and

Figures 2 and 3 are transverse sectional views taken respectively on the lines 2—2 and 3—3 of Figure 1.

Referring now to the drawings in detail wherein for the purpose of illustration I have disclosed a preferred embodiment of the invention, the numeral 5 designates the valve body of cylindrical form and having an inlet port 6 at one side thereof and a discharge port 7 at one end of the body. The other end of the body is closed by a plug 8 through which a screw 9 is threaded and manipulated by a knob 10 at its outer end and secured in threadedly adjusted position in the plug by means of a lock nut 11.

The end of the body 5 adjacent the outlet port 7 is formed with an internal shoulder 12 against which the valve cage, designated generally at 13 is engaged.

The cage 13 includes a substantially dome-shaped inner end member 14 formed with a recess 15 for receiving the tapering end 16 of the screw 9. The member 14 is also formed with a skirted portion 17 having a sliding fit in the body 5 and adapted to abut the shoulder 12, a gasket 18 being positioned between the edge of the skirt and the shoulder.

A wall or partition 19 is formed in the dome 14 and the walls of the dome inwardly of the partition 19 are formed with a plurality of openings 20. The wall 19 is formed with a central opening 21 provided with a lip 22 on the outer side of the wall 19.

The opening 21 of the front cage member 14 is closed by means of a disk valve 23 seated against the lip 22 and retained in position by means of a spring 24 bearing against the rear face of the valve and seated in a recess 25 of a retaining ring 26 positioned in the rear end of the valve body 5 adjacent the outlet port 7.

The ring 26 is formed at its front end with a threaded flange 27 threadedly connected internally to the skirt 17 of the front member 14 and also arranged to abut the shoulder 12. The ring 26 is also formed with a plurality of openings 28 by means of which air may pass therethrough upon the opening of the valve 23.

From the foregoing it will be apparent that the cage 13 including the front dome-shaped member 14 and the ring 26 may be assembled as a unit with the valve 23 mounted therein and inserted in the valve body 5 upon removal of the plug 8. The valve cage is held tightly against the shoulder 12 of the valve body by means of the set screw 9.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What is claimed is:

A check valve comprising a hollow body having a side inlet port and a discharge port at one end thereof, a shoulder in said body extending around the same between said ports, a valve cage fitted in said body for removal out of the other end thereof and comprising a hollow dome shaped skeleton section forming a skirt opposed to said shoulder, said section having an axially apertured front fall set back in said skirt with a circumferential lip around said aperture, a ported ring section having a circumferential flange threaded into said skirt and opposed to said shoulder, a spring pressed valve disk between said sections seating against said lip and closing said aperture, and means for forcing said skirt and flange against said shoulder from said other end of said body.

CHARLES D. PANTON.

REFERENCES CITED

The following references are of record in the file of this patent:

UNITED STATES PATENTS

| Number | Name | Date |
|---|---|---|
| 754,569 | Jones | Mar. 15, 1904 |
| 811,361 | Beach | Jan. 30, 1906 |
| 1,604,487 | Scovel | Oct. 26, 1926 |